United States Patent
Decker et al.

(10) Patent No.: US 11,652,703 B2
(45) Date of Patent: *May 16, 2023

(54) DYNAMIC PROCESSING DISTRIBUTION FOR UTILITY COMMUNICATION NETWORKS

(71) Applicant: Landis+Gyr Innovations, Inc., Alpharetta, GA (US)

(72) Inventors: David Decker, Atlanta, GA (US); Keith Mario Torpy, Sydney (AU); Matthew Donald Karlgaard, Brainerd, MN (US); James Randall Turner, Alpharetta, GA (US); Ruben E. Salazar Cardozo, Johns Creek, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,152

(22) Filed: Apr. 18, 2022

(65) Prior Publication Data

US 2022/0321425 A1    Oct. 6, 2022

Related U.S. Application Data

(63) Continuation of application No. 17/218,802, filed on Mar. 31, 2021, now Pat. No. 11,336,536.

(51) Int. Cl.
*G06F 15/173* (2006.01)
*H04L 41/00* (2022.01)
(Continued)

(52) U.S. Cl.
CPC .......... *H04L 41/20* (2013.01); *H04L 41/0813* (2013.01); *H04L 41/0833* (2013.01);
(Continued)

(58) Field of Classification Search
CPC . H04L 41/20; H04L 41/0813; H04L 41/0833; H04L 67/10; H04L 67/12; H04W 84/22
See application file for complete search history.

(56) References Cited

U.S. PATENT DOCUMENTS 11,336,536 B1 * 5/2022 Decker .............. H04L 41/0813
2017/0366472 A1   12/2017 Byers et al.
(Continued)

FOREIGN PATENT DOCUMENTS

WO    2020009875    1/2020

OTHER PUBLICATIONS

Mach et al., Mobile Edge Computing: A Survey on Architecture and Computation Offloading, IEEE Communications Surveys & Tutorials, vol. 19, No. 3, Available Online at: https://ieeexplore.ieee.org/stampPDF/getPDF.jsp?tp=&arnumber=7879258&ref=aHR0cHM6Ly9pZWVIeHBsb3JlLmllZWUub3JnL2RvY3VtZW50Lzc4Nz kyNTg=>, Mar. 13, 2015, 28 pages.

(Continued)

*Primary Examiner* — Richard G Keehn
(74) *Attorney, Agent, or Firm* — Kilpatrick Townsend & Stockton LLP

(57) ABSTRACT

Technologies for implementing edge intelligence for utility communication networks are provided. For example, a system includes a mesh network and a utility fog configured to manage the mesh network. The utility fog includes a secure utility system configured for executing a private utility application and a first edge intelligence device configured for executing a first subset of software applications. Each software application is configured to manage endpoints in the mesh network or process data collected by the mesh network. The mesh network includes the endpoints and an edge intelligence device configured for executing a second (Continued)

subset of the software applications that is different from the first subset of software applications.

20 Claims, 6 Drawing Sheets

(51) Int. Cl.
*H04L 41/0833* (2022.01)
*H04L 41/0813* (2022.01)
*H04W 84/22* (2009.01)
*H04L 67/10* (2022.01)
*H04L 67/12* (2022.01)

(52) U.S. Cl.
CPC .............. *H04L 67/10* (2013.01); *H04L 67/12* (2013.01); *H04W 84/22* (2013.01)

(56) References Cited

U.S. PATENT DOCUMENTS

| | | | |
|---|---|---|---|
| 2019/0109891 A1* | 4/2019 | Paruchuri | H04L 9/40 |
| 2020/0250003 A1* | 8/2020 | Yang | G06F 21/44 |
| 2020/0310394 A1* | 10/2020 | Wouhaybi | H04L 41/0846 |
| 2021/0014113 A1* | 1/2021 | Guim Bernat | H04L 41/042 |
| 2021/0014114 A1* | 1/2021 | Doshi | H04L 41/5019 |
| 2021/0014133 A1* | 1/2021 | Maciocco | H04L 41/5009 |
| 2021/0286655 A1* | 9/2021 | Liu | G06F 9/5083 |

OTHER PUBLICATIONS

International Application No. PCT/US2022/022370, Invitation to Pay Additional Fees and, Where Applicable, Protest Fee mailed on Jul. 4, 2022, 13 pages.
PCT/US2022/022370, International Search Report and Written Opinion, dated Aug. 25, 2022, 20 pages.
U.S. Appl. No. 17/218,802, Non-Final Office Action, dated Sep. 24, 2021, 11 pages.
U.S. Appl. No. 17/218,802, Notice of Allowance dated Jan. 20, 2022, 5 pages.

* cited by examiner

DYNAMIC PROCESSING DISTRIBUTION FOR UTILITY COMMUNICATION NETWORKS

RELATED APPLICATIONS

This application is a continuation of U.S. patent application Ser. No. 17/218,802, titled "Dynamic Processing Distribution For Utility Communication Networks" and filed on Mar. 31, 2021, which is incorporated herein in its entirety

TECHNICAL FIELD

This disclosure generally relates to utility communication networks, such as a mesh network for an electricity distribution network, and more particularly relates to implementing dynamic processing distribution for utility communication networks.

BACKGROUND

Traditional utility communication networks are configured with a centralized command and control architecture where the control functions and most data analytics functions are concentrated in a headend system. The network devices in the utility communication network simply act as routers, connecting the utility central headend system to the endpoints. Data or messages have to travel from the endpoints to the headend system through the utility communication network and responses have to travel back to the endpoints over the utility communication network. Such a round trip between the endpoint and the headend system can cause delays in responding to events that occurred at the endpoints, which can be problematic especially for time-critical applications such as controlling or monitoring. In addition, the network bandwidth consumption also increases because of the data traversing the utility communication network between endpoints and the headend system. Further, in some cases, data transmitted from the endpoints to the headend system are not used or needed by the headend system, resulting in the waste of network resources.

SUMMARY

Aspects and examples are disclosed for apparatuses and processes for implementing dynamic processing distribution for utility communication networks. In one example, a system includes a utility fog and a mesh network. The utility fog includes a secure utility system configured for executing a private utility application. The private utility application is executed exclusively by the secure utility system. The utility fog further includes a first edge intelligence device configured for executing a first subset of applications of a plurality of software applications. Each application in the plurality of software applications is configured to process data collected by one or more endpoints in a mesh network managed by the utility fog or manage the one or more endpoints. The mesh network is in communication with the utility fog through another network and includes a plurality of endpoints in communication with each other through the mesh network and configured for collecting data measuring characteristics of a resource distribution network. The mesh network further includes a second edge intelligence device configured for executing a second subset of applications of the plurality of software applications and a third edge intelligence device configured for executing a third subset of applications of the plurality of software applications, wherein the first, second, and third subsets of applications are different. An endpoint of the plurality of endpoints is further configured to send a task request for a particular application to at least the second edge intelligence device and the third edge intelligence device. Both the second subset of applications and the third subset of applications comprise the particular application. The task request comprises data to be processed by the particular application and a task assignment list specifying portions of the data to be processed by the second edge intelligence device and the third edge intelligence device, respectively. The end point is further configured to receive processing results from the second edge intelligence device and the third edge intelligence device.

In another example, an edge intelligence device includes a communication device comprising a plurality of network interfaces configured for communicating with devices in a plurality of utility communication networks. A first utility communication network of the plurality of utility communication networks is associated with a first resource distribution network and endpoints in the first utility communication network have a first asset type and communicate with each other using a first network protocol. A second utility communication network of the plurality of utility communication networks is associated with a second resource distribution network and endpoints in the second utility communication network have a second asset type and communicate with each other using a second network protocol. The first resource distribution network is different from the second resource distribution network. The first network protocol is different from the second network protocol and the first asset type is different from the second asset type. The communication device is further configured for communicating with respective utility fogs of the plurality of utility communication networks. The edge intelligence device further includes a processing device configured to execute computer-readable instructions, and a memory configured to store a plurality of software applications and the computer-readable instructions that, when executed by the processing device, cause the processing device to perform operations. The operations include parsing data received via the first utility communication network according to the first network protocol; parsing data received via the second utility communication network according to the second network protocol; executing at least one of the plurality of software applications to process the data received via the first utility communication network; executing one or more of the plurality of software applications to process the data received via the second utility communication network; generating a first message based on the processed data from the first utility communication network and transmitting the first message via the first utility communication network according to the first network protocol; and generating a second message based on the processed data from the second utility communication network and transmitting the second message via the second utility communication network according to the second network protocol.

In yet another example, a mesh network includes a plurality of endpoints in communication with each other through the mesh network and configured for collecting data measuring characteristics of a resource distribution network associated with the mesh network. The mesh network further includes a plurality of edge intelligence devices, each edge intelligence device configured for executing a subset of software applications of a plurality of software applications. Each software application in the plurality of software applications is configured to process data collected by one or more endpoints of the plurality of endpoints or manage the one or more endpoints. A first subset of software applications on a first edge intelligence device is different from a second subset of software applications on a second edge intelligence device. An endpoint of the plurality of endpoints is further configured to send a task request for a particular application to at least the first edge intelligence device and the second edge intelligence device. Both the first subset of software applications and the second subset of software applications comprise the particular application. The task request comprises data to be processed by the particular application and a task assignment list specifying portions of the data to be processed by the first edge intelligence device and the second edge intelligence device, respectively. The end point is further configured to receive processing results from the first edge intelligence device and the second edge intelligence device.

These illustrative aspects and features are mentioned not to limit or define the presently described subject matter, but to provide examples to aid understanding of the concepts described in this application. Other aspects, advantages, and features of the presently described subject matter will become apparent after a review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
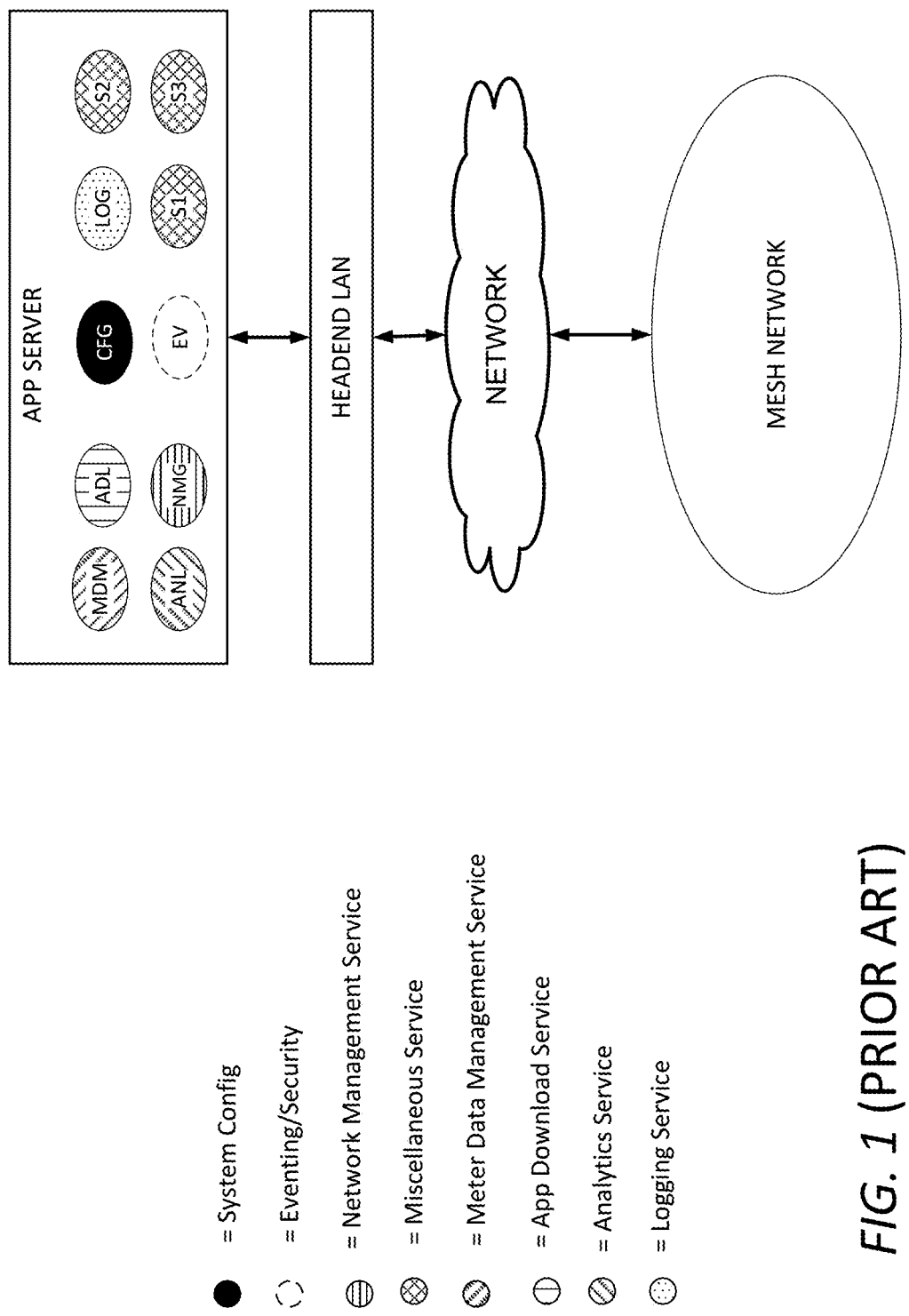
FIG. 1 is a block diagram showing a prior art system architecture for a mesh network.

Technologies are provided for implementing dynamic processing distribution for utility communication networks. For example, the dynamic processing distribution can be realized by distributing functionalities traditionally provided by a single headend system to edge intelligence devices that are deployed in a utility communication network. As used herein, a utility communication network refers to a communication network associated with a resource distribution network and configured to enable communications between endpoints in the utility communication network. Examples of a utility communication network include mesh networks, LoRaWAN® networks, or other networks suitable for Internet of things (IoT) devices, such as meters. The edge intelligence devices can be configured to execute different software applications to provide various functionalities. Different edge intelligence devices may execute different sets of software applications thereby providing different functionalities. Edge intelligence devices may also be deployed to a utility fog connected to the utility communication network and configured to manage the utility communication network. In addition, the functionality may be further distributed to regional fogs or a global cloud to leverage the computing resources provided by the regional fogs and the global cloud.

The following non-limiting example is provided to introduce certain embodiments. In this example, a utility system includes a utility communication network associated with a resource distribution network, such as a power grid, a gas distribution network, or a water distribution network, and a utility fog configured to manage the utility communication network. The utility communication network connects multiple endpoints deployed throughout the resource distribution network. Functionalities for managing the utility communication network and processing data for the utility communication network are implemented through a set of software applications, each software application implementing one aspect of the functionalities. The utility communication network further includes multiple edge intelligence devices located at various places in the utility communication networks. Each edge intelligence device is configured to execute a subset of the software applications thereby providing a subset of the functionalities to the endpoints in the utility communication network. The subset of software applications for each edge intelligence device is determined based on factors such as the location of the edge intelligence device, the status of the endpoints near the edge intelligence device, the typical processing performed for the endpoints near the edge intelligence device, and so on.

In order to make other devices in the utility communication network aware of functionalities provided by an edge intelligence device, each edge intelligence device is configured to advertise the functionalities that it can provide over the utility communication network. In some implementations, these functionalities are provided as software services by the edge intelligence device. If an endpoint in the utility communication network has a certain task need to be performed, such as processing data collected by the endpoint, the endpoint can send a request to a nearby edge intelligence device that is capable of performing the task. In some scenarios, such as when a task involves complicated computations, the task may be sent to two or more edge intelligence devices that jointly perform the task. In some examples, which edge intelligence device(s) are used to perform the requested task is made transparent to the endpoint. The edge intelligence device returns the results of the processing to the endpoint or another device in the utility communication network once it is completed.

In addition to distributing the edge intelligence devices to the utility communication network, edge intelligence devices can also be deployed in the utility fog. Similar to edge intelligence devices in the utility communication network, each edge intelligence device in the utility fog can also be configured to implement a subset of the software applications. These edge intelligence devices may be used to perform tasks that cannot be handled by the edge intelligence devices in the utility communication network or tasks that are preferably performed by the edge intelligence devices in the utility fog.

Continuing this example, subsets of software applications implementing various functionalities of managing the utility communication network or processing data for the utility communication network can be further distributed to regional fogs and a global cloud. Regional fogs can offer more computational power than the utility fog and the utility communication network, but may have larger delays in returning the results. Likewise, further delays in returning the results may be introduced if the global cloud is utilized to execute the software applications to perform tasks for the utility communication network, but tasks that cannot be efficiently handled by other layers of the system (e.g., high complexity tasks such as generating topology graph for the utility communication network) can be performed using the applications executing in the global cloud.

Techniques described in the present disclosure provide improvements to utility communication networks. By distributing the functionalities of a traditional single headend system to devices in the utility communication network, the processing or controlling can be performed locally near the endpoints by employing nearby edge intelligence devices. As a result, the response time for time-critical applications such as controlling or monitoring can be significantly reduced. Further, because the data from the endpoints do not need to be transmitted across the utility communication network to the headend system, the network bandwidth consumptions of the utility communication network are also reduced. In addition, the subset of applications installed on each of the edge intelligence devices can be updated whenever needed without impacting other parts of the system. Additionally, implementing the functionalities on multiple edge intelligence devices allows parallel distributed computation which can improve the performance of the system, reduce the time needed to run complex computations, and enhance fault tolerance computing.

FIG. 1 is a block diagram showing a prior art system architecture for a utility communication network based on a mesh network. The prior art system has a centralized architecture where all the functionalities for controlling and processing data for the mesh network are concentrated at the headend system. As shown in FIG. 1, various applications, such as applications for managing the network, managing and analyzing the meter data, are all installed on an application server or a group of co-located servers. As discussed above, this centralized architecture causes various problems, such as increased delay in response to events that occurred in the mesh network, increased network bandwidth consumption, and so on.

Figure 2:
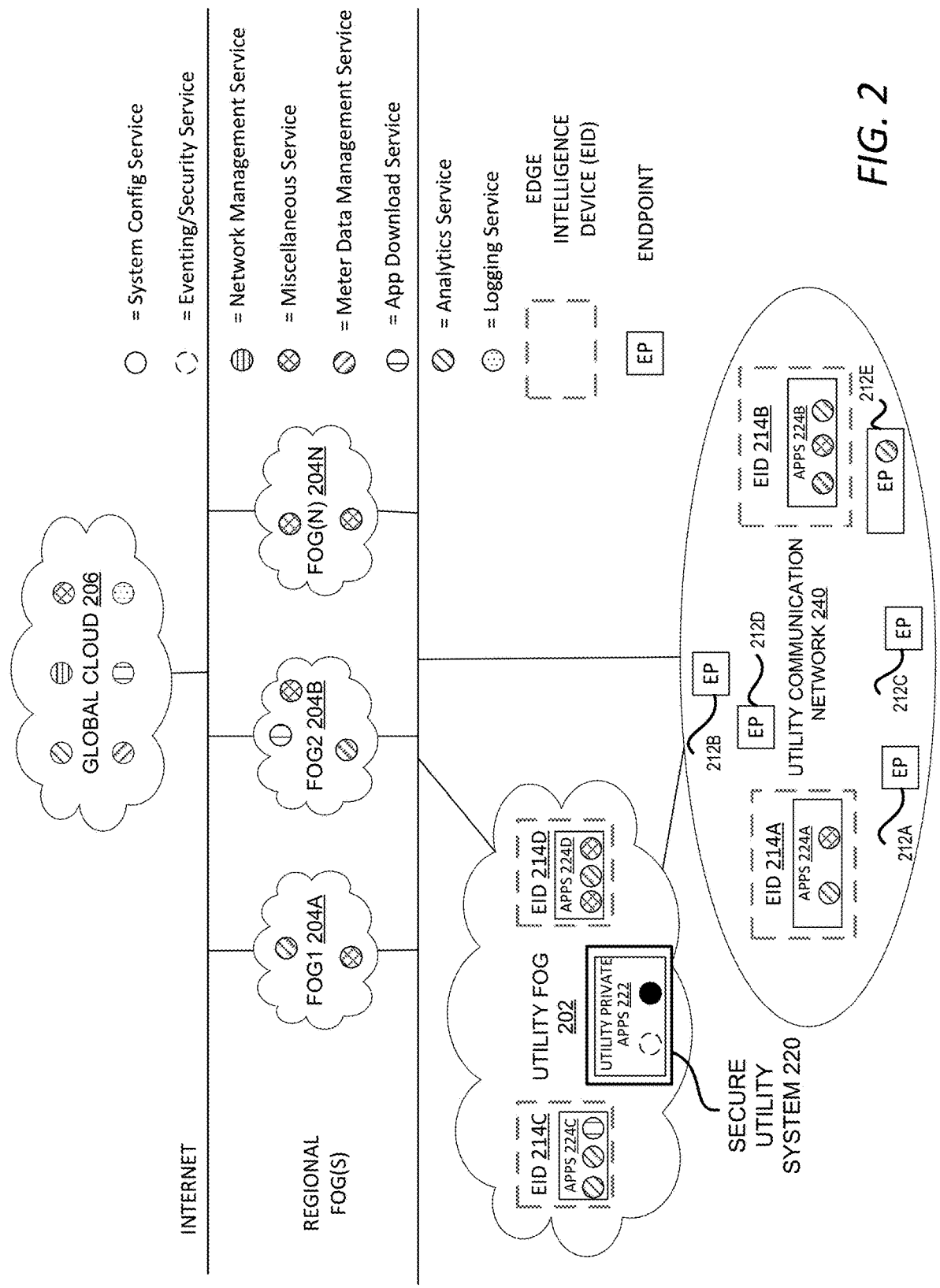
FIG. 2 is a block diagram showing an illustrative system architecture implementing edge intelligence for a utility communication network, according to certain aspects of the present disclosure.

FIG. 2 shows a block diagram depicting an illustrative system architecture implementing dynamic processing distribution, which may also be referred to as edge intelligence, for a utility communication network, according to certain aspects of the present disclosure. The system has multiple layers of services for controlling and processing data for a utility communication network 240. These layers of services include services provided at the utility communication network 240, a utility fog 202, a regional fog 204, and a global cloud 206.

The utility communication network 240 is a communication network associated with a resource distribution network and configured to enable communications between endpoints (e.g., endpoints 212A-E, referred to herein individually as an endpoint 212 or collectively as endpoints 212) in the utility communication network. Examples of a utility communication network include a mesh network, a LoRaWAN® network, or other networks suitable for Internet of things (IoT) devices. Endpoints 212 in the utility communication network 240 may be any devices on the utility communication network 240 that contain a radio. For example, the endpoints 212 may include measuring devices for collecting data from the respective deployed location of the endpoints, processing devices for processing data available to the devices, or devices that are configured to perform a combination of these functions.

In one example, the utility communication network 240 can be used to deliver measurement data obtained in the associated resource distribution network. In this example, the endpoints 212 can include meters deployed at various geographical locations of the customer premises through the resource distribution network, such as electricity meters, gas meters, water meters, steam meters, etc., and be implemented to measure various operating characteristics of the resource distribution network. In the example of a power distribution network, example characteristics include, but are not limited to, average or total power consumption, the peak voltage of the electrical signal, power surges, and load changes. The endpoints 212 can also include other types of network devices such as overhead line sensors, and load control switches that monitor energy usage and automatically switch off high-usage equipment when the energy demand spikes.

The utility communication network 240 can further include edge intelligence devices (EIDs) 214A-214B, referred to herein individually as an edge intelligence device 214 or collectively as edge intelligence devices 214. Each edge intelligence device 214 is configured to execute a subset of the functionalities traditionally provided by a headend system of the utility communication network 240. These functionalities can be implemented as individual software applications and each application implements one functionality or one aspect of the functionality. For example, the functionality of determining whether two electricity meters are connected to the same transformer of a power distribution network can be implemented in one software application deployed and executed on an edge intelligence device. Alternatively, or additional, the same functionality can be broken down into subtasks and each software application implements one subtask. In the example of determining whether two electricity meters are connected to the same transformer, multiple software applications can be generated. For instance, a first application can be configured to normalize the voltage signals of the two electricity meters, a second application can be configured to perform a correlation between the voltage signals of the two electricity meters and a third application can be configured to compare the correlation with a threshold value to determine whether they are connected to the same transformer. In some examples, these functionalities can be offered as services to the endpoints 212 in the utility communication network 240.

In the example shown in FIG. 2, the functionalities of a traditional headend system are implemented as services in different categories. These services include system configuration services for configuring the utility communication network 240 (e.g., admitting or removing endpoints or other network devices in the utility communication network 240, adding or removing applications executed on the network devices in the utility communication network 240), and eventing and security services for managing the security of the utility communication network 240. The services can further include network management services (e.g., collecting data from endpoints and identifying and remediating problems in the utility communication network 240), meter data management service (e.g., categorizing, aggregating, or otherwise managing data collected by the endpoint meters), logging services (e.g., logging data and events that occurred on the utility communication network 240), analytics service (e.g., performing various analysis on the data collected or generated by the endpoints), application download services (e.g., managing the applications installed on endpoint devices or other devices in the utility communication network 240), and other miscellaneous services (e.g., diagnostic applications, applications for performing a specific type of calculations).

Among the various services, some services have a significant impact on the system or are vulnerable to attacks, such as the system configuration services and eventing and security services. These services are protected in a highly secured environment and are referred to as private utility applications or services. In some examples, these private utility applications are hosted privately in the utility fog 202. As used herein, a utility fog refers to a processing system which may include one or more computing devices (e.g., network devices or computer devices) configured to perform processing to provide services to other devices within a geographic region associated with the utility fog.

The utility fog 202 can be associated with the utility company (e.g., under the physical protection of the utility company and within the firewall of the utility company network) and configured to manage the utility communication network 240, for example, through executing the private utility applications. To better protect the private utility applications, these private utility applications can be installed and executed in a secure utility system 220 within the utility fog 202. Different from the other parts of the utility fog 202, the secure utility system 220 can be implemented in a highly secure environment, for example, using different network configurations and in a separate network or domain than other parts of the utility fog 202.

Other non-private services or applications can be deployed to the edge intelligence devices in the utility communication network 240. As shown in FIG. 2, different edge intelligence devices 214 may be configured to execute different subsets of applications 224A-224C. The subset of applications 224 installed on each of the edge intelligence devices 214 can be determined based on factors such as the geographical location or region of the individual edge intelligence device 214, the type of endpoints 212 near the edge intelligence device 214 (which determines the functionalities required for processing the data of these endpoints 212), how often the functionalities provided by the installed applications are used, the computing capability of the edge intelligence device 214, and so on. Similar factors are also considered when determining where to deploy the edge intelligence devices 214 over the utility communication network 240.

In addition, the subset of applications 224 installed on an edge intelligence device 214 can be dynamically updated. For example, if abnormalities are observed or reported for endpoints 212 in a particular region, the utility fog 202 can deploy, using the system configuration application, a diagnostic application to the edge intelligence devices 214 in that region. The diagnostic application can be configured to perform diagnostic analysis and report the analysis results back to the utility fog 202. The diagnostic application can be later removed from those edge intelligence devices 214 after the problem is resolved. Similarly, the utility fog 202 can also add or remove other applications to each of the edge intelligence devices 214 in the utility communication network 240, for example, by using the system configuration application in the private utility applications 222. The utility fog 202 can also update the applications 224 installed on the edge intelligence devices 214, for example, to a newer version of the applications 224.

In some examples, the edge intelligence devices 214 can be configured to execute multiple instances of the same application. FIG. 2 shows that edge intelligence device 224B is configured to execute two instances of the analytics application. This allows parallel processing on the edge intelligence device 214 so that the edge intelligence device 214 can complete a task faster or service multiple endpoints 212 at the same time. In the present disclosure, discussion regarding update, removal, or addition of an application also includes the update, removal, or addition of an application instance. For example, adding a new application may include adding a new application or a new application instance (including an additional instance of an existing application or an instance of a new application).

Figure 3:
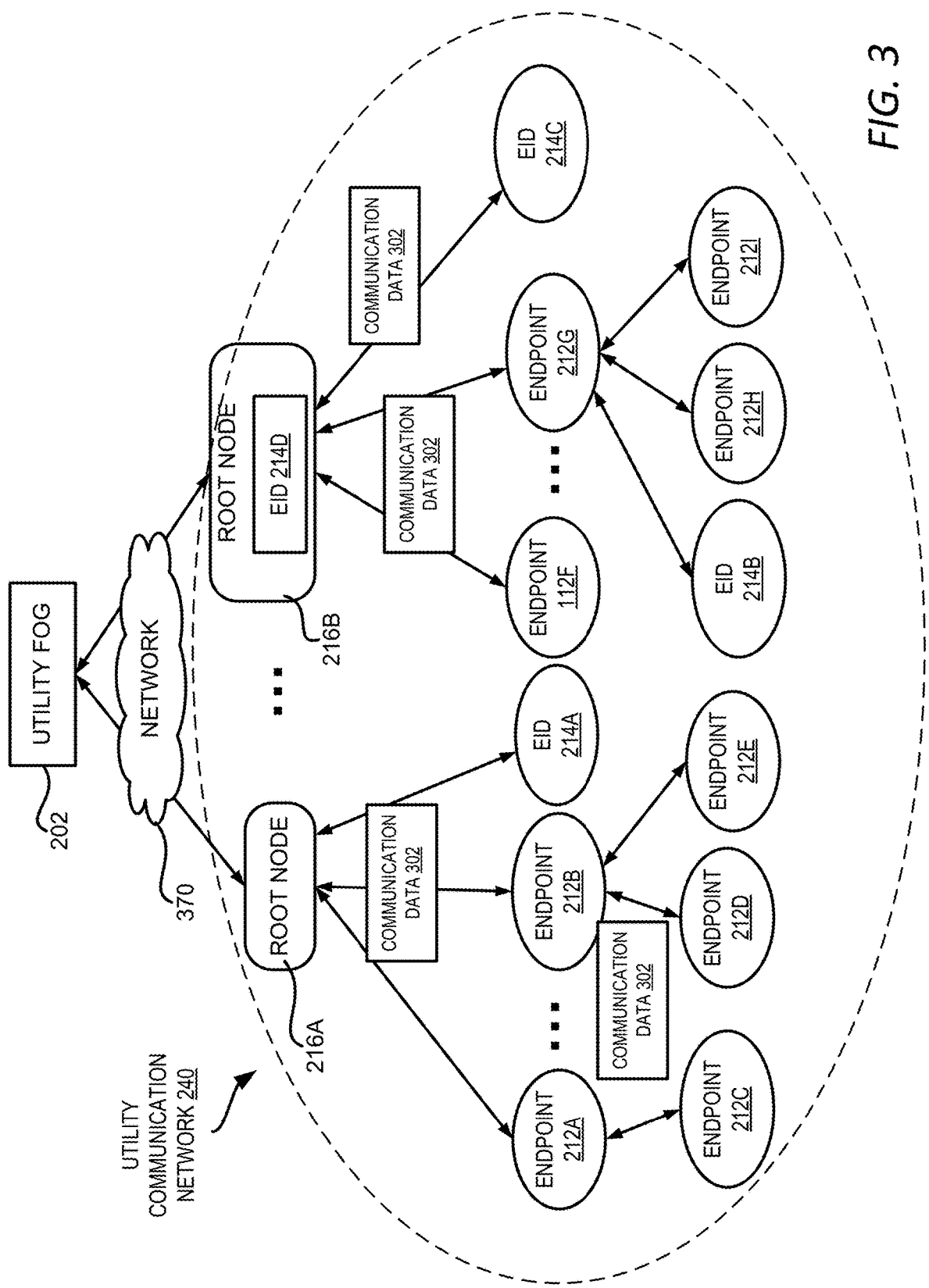
FIG. 3 shows an example of a utility communication network that includes endpoints and edge intelligence devices deployed over the utility communication network, according to certain aspects of the disclosure.

FIG. 3 shows an example of a utility communication network 240 that includes endpoints 212A-212I and edge intelligence devices 214A-214D communicatively connected through the utility communication network 240. As shown in FIG. 3, an edge intelligence device 214 may be a stand-alone edge intelligence device or a component integrated into an existing network device, such as a root node 216B. In some examples, each edge intelligence device 214 is configured to, after being deployed in the utility communication network 240, advertise the services or functionalities it can provide over the utility communication network 240. The services provided by the edge intelligence devices 214 may overlap or be duplicated across several edge intelligence devices 214. These services may be discovered dynamically among the devices in the utility communication network 240. Certain network devices, such as endpoints with more computing power or edge intelligence devices, can be configured to keep a record of the services provided by the edge intelligence devices in its region. When an endpoint 212 has a task to be completed, it transmits a request for the task along with task data to its parent node or another neighboring node. Such a request can be transmitted further through the utility communication network 240 until it reaches a network device that can identify one or more edge intelligence devices capable of performing the requested task. This network device can then forward the request and the associated data to the identified edge intelligence devices 214 for processing. The process of selecting the proper edge intelligence device 214 for a task can be made transparent to the request endpoint 212.

For example, if there are three devices (edge intelligence devices or endpoints) M1, M2, M3 and two gateways GW1, GW2. M1 and M2 are connected (wired or wirelessly) to GW1, and M3 is connected (wired or wirelessly) to GW2. GW1 and GW2 are also connected, wired or wirelessly. M1 supports services A, B, and C; M2 supports services B, C, and F; M3supports service C; GW1 supports services C, D, E, and F; GW2 supports services E and F. When M1 boots up, M1 can inform GW1 that it supports services A, B and C. Likewise, M2 can inform GW1 that it supports B, F and C and M3 can inform GW2 that it supports service C.

If M1 wants to perform service F, it can first check its list of local services. Since M1 does not support service F, M1 can communicate with its parent device GW1 for help in locating a provider for service F. Because GW1 supports F, GW1 can inform M1 to send the service request to GW1. In response to the service request, GW1 performs service F on the data provided by M1 and returns the results to M1.

If a device, for example M1, has multiple service requests, these service requests can be sent one-to-one or parallelized. When making a parallelized request, M1 can send an inquiry for service C. In the above example, M1 itself, M2, GW1 and M3 may all respond indicating that they support service C. M1 can then send a task request containing the data and a task assignment list to multiple devices that have responded. The task assignment list can specify portions of the data to be processed by the individual devices using service C. In some examples, M1 may generate the assignment list so that these multiple devices perform service C on all of the data for redundancy. Alternatively, or additionally, M1 may divide the data into multiple sets, and in the assignment list, request each device run service C against one set of data. Other examples of assignment lists may also be utilized. This above interactions among devices can be implemented through a publish-subscribe mechanism and a work package data structure that specifies which data is to be processed by each device.

It should be further understood that in some examples, there is no dynamic routing of a request to a device providing a service. As the request moves up the network, in each step there is no application decision about where the request should go. The device issuing the request discovers the services available, and makes the decision about which device the request will go to. This decision is made once by the requesting device and the network will not decide a better service to go to once the request is transmitted.

Upon receiving the request, the edge intelligence device 214 executes the proper application(s) 224 and outputs the processing results. Depending on the type of the task, the results may be returned to the requesting endpoint 212, sent to another edge intelligence device 214, or transmitted to the utility fog 202. For example, if the task is to adjust parameters of the endpoint 212 based on the observed data, the edge intelligence device 214 can be configured to generate and transmit a command to the endpoint 212 to adjust its parameters to proper values according to the results. If the task performed by the edge intelligence device 214 is a subtask and further subtasks need to be performed, the edge intelligence device 214 can be configured to generate and transmit the output results to the next edge intelligence device 214 configured for performing the subsequent subtasks. In scenarios where the task is to summarize, aggregate, or analyze the data collected by the requesting endpoint 212 for further analysis by the utility fog 202, the edge intelligence device 214 can be configured to transmit the output results to the utility fog 202 over the utility communication network 240.

In some examples, the edge intelligence devices 214 are configured with advanced edge processing capabilities, by implementing rule-based algorithms, or artificial intelligence or machine learning techniques, or a combination of both in, for example, an advanced edge processing module. The advanced edge processing module can use these advanced technologies to, for example, implement different types of service level requirements. For example, the advanced edge processing module can be configured to check data related to the health of the power distribution network, such as the value of the power quality, the required voltage, the required power factor, etc. The advanced edge processing module can also be configured to check data related to the communications network health, such as throughput, interference, packet success rates, layer, latencies, etc. The advanced edge processing module can use the advanced technologies to determine whether the obtained or generated data should be sent to the utility fog 202 or processed locally. For example, if the advanced edge processing module determines that there is a large volume of data, such as larger than a threshold volume value for a given time period, the advanced edge processing module can determine to process or pre-process the data locally. Depending on the processing or pre-processing results, the advanced edge processing module can further determine whether the processed data should be sent to the utility fog 202 or maintained locally or discarded. For instance, if the processed data contains power consumption data that the utility fog 202 typically collects, then the advanced edge processing module can send the data to the utility fog 202. If the data is processed for detecting abnormality in the power distribution network and no indication of abnormality is detected from the collected data, the advanced edge processing module may determine not to send the data. In another example, the advanced edge processing module can determine to process the data locally if the need for a real-time response is important. For example, data related to the load control in the power distribution network typically needs to be completed in milliseconds, and the advanced edge processing module may determine to process such data locally, instead of sending it to the utility fog 202. In this way, data that do not need to be transmitted to the utility fog 202 will not be transmitted thereby reducing the waste of network resources.

The edge intelligence devices 214, or other devices (e.g., the endpoints 212) that need to transmit data to the utility fog 202, can transmit the data or messages as communication data 302 through the utility communication network 240 to root nodes 114A-B. Root nodes 114 are one type of network device and may be personal area network (PAN) coordinators, gateways, or any other devices capable of communicating with the headend system 104. Root nodes 114 of the utility communication network 240 may be configured for communicating with the network devices including endpoints 212 and edge intelligence devices 214 to perform operations such as managing the network devices, collecting data from the network devices, and forwarding data to a utility fog 202. A root node 216 can also be configured to function as a node to measure or process data itself.

The root nodes 216 ultimately transmit the data received via the utility communication network 240 to the utility fog 202 via another network 370 such as the Internet, an intranet, or any other data communication network. The utility fog 202 can receive the data or messages from the root nodes 216 and process or analyze the received data for various purposes, such as billing, performance analysis, or troubleshooting. It should be appreciated that while FIG. 3 depicts a specific network topology (e.g., a DODAG tree), other network topologies are also possible (e.g., a ring topology, a mesh topology, a star topology, etc.).

Referring back to FIG. 2, to process the received data or messages from the utility communication network 240, the utility fog 202 can also include edge intelligence devices 214. Similar to the edge intelligence devices 214 in the utility communication network 240, each of the edge intelligence device 214 may be a dedicated edge intelligence devices 214 or a component integrated into or implemented by an existing device in the utility fog 202, such as a server computer. Each edge intelligence device 214 can be configured to execute a subset of the applications that are not private utility applications, also referred to herein as "non-private utility applications."

The utility fog 202 may request the received messages or data to be processed by one or more of these edge intelligence devices 214. For example, if the received message is a request to download a new version of the application, the utility fog 202 can forward that request to the edge intelligence device 214C that can execute the download application to provide the download service to the requesting network device. Likewise, the utility fog 202 can also send data analysis tasks to edge intelligence devices 214 that are capable of providing the data analysis service.

In addition to the edge intelligence devices 214 within the utility fog 202, the utility fog 202 may further distribute non-private utility applications to regional fogs 204A-204N referred to herein individually as a regional fog 204 or collectively as the regional fogs 204. A regional fog is a processing system including a collection of computing devices (e.g., Internet gateways and routers) associated with a geographic region (e.g., southwest U.S. or east coast of the U.S.). Different subsets of applications may be installed on different regional fogs 204. The utility fog 202 can submit tasks to devices (not shown in FIG. 2) in the regional fogs 204 and configured to record the applications installed on the regional fogs 204. These devices can assign the tasks to the proper regional fogs for execution. In some examples, the utility communication network 240 can also be configured to submit tasks to the regional fogs 204.

In further examples, the non-private utility applications may be further deployed to a global cloud 206 that is accessible through the Internet. The global cloud can be a third-party provider that delivers computing resources over the Internet. The utility fog 202, the utility communication network 240, or the regional fogs 204 may submit appropriate tasks to the global cloud 206 for execution, depending on the applications deployed to the global cloud 206.

It should be noted that the four layers of services shown in FIG. 2 can be utilized to meet a wide variety of service requirements. For example, for time-critical tasks, such as the load control in a power distribution network which typically needs to be completed in milliseconds, the services provided by the edge intelligence devices near the load control region in the utility communication network 240 can be employed to meet such strict low-latency requirements. For tasks that do not have such strict latency requirements, the processing can be performed in the utility fog 202. Since the utility fog 202 is logically close to the utility communication network 240, the response time is fairly small and the services offered by the utility fog 202 can be used for low-latency tasks.

The regional fogs 204, on the other hand, are relatively far from the utility communication network 240 either physically or logically, or both. However, it has more computing resources than the utility fog 202 and the utility communication network 240. As such, the regional fogs 204 are suitable for tasks with no low-latency requirements but require more computing powers. Similarly, the global cloud 206 is even further away from the utility communication network 240 and the utility fog 202, but with plenty of storage and computing resources. Tasks with no time constraints but requiring large storage or computing resources can be performed by the global cloud 206. For example, the global cloud 206 may be used to perform tasks such as statistical analysis over a large amount of data points, identification of patterns or correlations between data sets, building and executing machine learning models, etc. The global cloud 206 can be used to provide a user portal allowing users of the utility network to view their billing information.

It should be noted that since the computations are performed using the edge intelligence devices 214 deployed in the utility communication network 240, the endpoints 212 can be low-cost devices with minimal computing power. In some cases, endpoints 212 with more computing capabilities than other low-cost endpoints 212 may also be deployed in the utility communication network 240. In these cases, these endpoints 212 may be also configured to execute one or a small number of applications, such as the endpoints 212E shown in FIG. 3. These on-endpoint applications can provide further reduced response time compared to the edge intelligence device in its area, but their capabilities are limited by the computing power of their respective host endpoints.

For example, if a national utility of a specific country wants a national power quality report featuring an executive summary and some level of detail about each province, city and neighborhood in that country. This national utility has 12 million smart meters installed across 10 provinces. Without the technology presented herein, this report has traditionally been produced by sending all data from 12 million smart meters to a central headend system and running report generation software at the headend system. If each meter sends about 1 k bytes of data, 12 GB of data needs to be sent to the headend system and stored to support this centralized processing.

By implementing dynamic processing distribution presented herein, the same report can be generated with less network resource consumption and lower computing requirement on a single device. For example, each meter can process (or if needed using a nearby edge intelligence devices 214) and send its own power quality summary statistical data to a neighborhood gateway device. The data can include summary statistics for each individual household about power quality, such as minimum and maximum voltage observed, average voltage, standard deviation, power factor, etc.

Each neighborhood gateway, which can also be an edge intelligence device 214, can consolidate and summarize the data from all meters in the neighborhood into a neighborhood quality report with appropriate summary statistics calculated at the gateway. The neighborhood reports can be forwarded, by the gateway or through the utility fog 202, to the nearest regional fog nodes. These regional fog nodes may cover a large city or rural section of a province. At the regional fog nodes, the data is further processed and analyzed to add regional statistics forming a region report. Various region reports are sent to a cloud-based service which produces the final power quality report, including the provincial summaries, and an executive summary.

In this way, it is no longer necessary to send a large volume of data to a central system. The amount of data sent is reduced at each level. The processing needed for producing the report is being done in parallel by many computing elements, rather than a single central server. The report can thus be generated in minutes instead of tens of hours, as required with the traditional centralized system. The detailed data on each household is also not in a single database at a datacenter, thus improving the information security of the system.

In some examples, the edge intelligence devices 214 can also be configured to evaluate the timeliness of the received or processed data before passing to the next device for further processing or for transmitting to the utility fog 202 or the regional fogs 204. The edge intelligence device 214 can determine the timeliness of the data based on timestamps of the data. In some implementations, the devices in the utility communication network 240 are time-synchronized and the traffic sent between the various devices can be timestamped. In this way, a device can determine how much time has elapsed from the time the data is transmitted to the time the data is received or processed. Based on the time information, the edge intelligence device 214 can determine whether the data is received timely and thus can be used for further tasks. For example, if an edge intelligence device 214 is used to analyze the power quality data sent by a collection of metering devices, the edge intelligence device 214 may determine the timeliness of the power quality data. If the data are stale, the edge intelligence device 214 may discard the data and disregard the associated information when making a decision about whether to switch a capacitor bank on or off (to try to correct the power quality issue). In this example, the data may be determined stale if it is received more than a few minutes ago, such as 5 minutes. Depending on the tasks, the threshold for determining stale data may be different.

Figure 4:
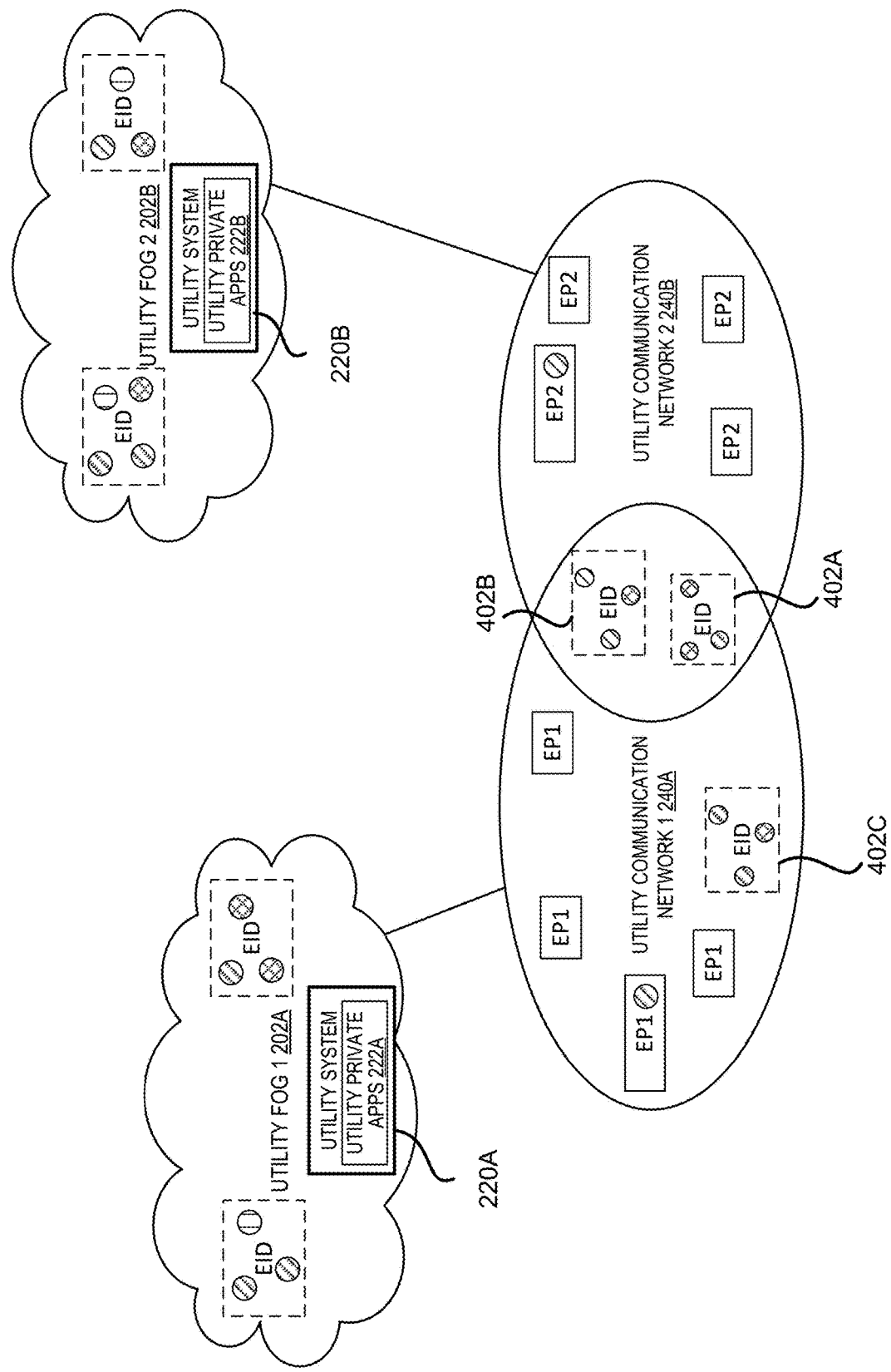
FIG. 4 shows an example of edge intelligence devices supporting multiple utility communication networks, according to certain aspects of the disclosure.

Referring now to FIG. 4, FIG. 4 shows an example of edge intelligence devices supporting multiple utility communication networks, according to certain aspects of the disclosure. In some examples, an edge intelligence device 214 is configured with multiple network interfaces, can implement multiple network protocols, and thus is able to communicate with multiple utility communication networks 240 associated with different distribution networks. As a result, the edge intelligence device 214 can use the applications installed on it to provide services to these multiple utility communication networks 240.

In the example shown in FIG. 4, the edge intelligence devices 402A-402B are able to support two utility communication networks 240A and 240B. In some examples, utility communication networks 240A and 240B are two different utility communication networks associated with two different resource distribution networks. For example, the utility communication network 240A may be a mesh network associated with a power distribution network with electricity meters as the endpoints 212. The utility communication network 240B may be a LoRaWAN® network associated with a gas distribution network with gas meters as the endpoints 212. In other examples, the utility communication networks 240A and 240B are two different utility communication networks associated with the same resource distribution network. For example, the two different utility communication networks 240 may be built at different stages or deployed to different geographical locations. As a result, these different utility communication networks 240 may be configured to use different network protocols for communications. In some examples, in order to process multiple communication protocols, the edge intelligence devices may be configured with a software defined radio (SDR) capable of processing multiple radio protocols.

The endpoints 212 in the respective utility communication networks 240 operate as described above, such as to measure and collect data in the respective utility communication networks 240. When there is a task to be performed, the endpoint in the utility communication network 240A can send the task request to its parent node or a neighboring node which eventually sends the request to the proper edge intelligence device 402A as discussed above with respect to FIG. 3. The edge intelligence device 402A can receive the request over the interface configured for communicating with the utility communication network 240A and parse the received request and any data associated therewith according to the network protocol used by the utility communication network 240A. The edge intelligence device 402A further performs the requested task by executing proper application(s) installed on it. The output results can be sent to the endpoints in the utility communication network 240A, other edge intelligence devices in the utility communication network 240A, or the utility fog 202A configured for managing the utility communication network 240A.

Endpoints EP2's in the utility communication network 240B may request the services of the edge intelligence device 402A in a similar way. In this case, the edge intelligence device 402A receives the request originated from an endpoint 212 in the utility communication network 240B over another interface configured for communicating with the utility communication network 240B and parses the received request and any data associated therewith according to the network protocol used by the utility communication network 240B. The edge intelligence device 402A further performs the requested task by executing the proper application(s) installed on it.

The applications used to serve the requests from the utility communication networks 240A and 240B may be the same or different. Some applications, such as applications for performing basic operations (e.g., correlation) may be used to provide services to both utility communication networks 240A and 240B. Some applications, however, may be network specific. For instance, applications configured to determine power factors are specific to the utility communication network 240A associated with the power distribution network and are used only to provide services to the utility communication network 240A. Likewise, applications that are specific to the gas distribution network would be used only to serve the utility communication network 240B. As such, updating, adding, removing these network-specific applications are performed by the respective utility fogs 202. Applications or application instances sharable by multiple networks may be added, updated, or removed by any utility fog 202 of these utility communication networks 240 when certain conditions are met (e.g., other utility fogs 202 approve the update, addition, or removal of the shareable applications).

In some scenarios, such as when the different utility communication networks 240 are associated with the same resource distribution network, different utility communication networks 240 need to communicate with each other, or data from these different utility communication networks 240 need to be combined. In these scenarios, the edge intelligence devices can be configured to provide protocol translation. For instance, the edge intelligence device may receive and parse data received from a first network according to a first network protocol, process the data using the applications, and then generate and transmit output packets over a second network according to the network protocol of the second network. In this way, devices in different utility communication networks can communicate with each other, and data from these different networks can be processed together even though these networks implement different network protocols.

It should be understood that in some implementations, not all the edge intelligence devices are configured to support multiple utility communication networks 240. Some edge intelligence devices may not have the capability to support multiple utility communication networks 240, while others may be configured to support one network even though it has the capability to support more.

Figure 5:
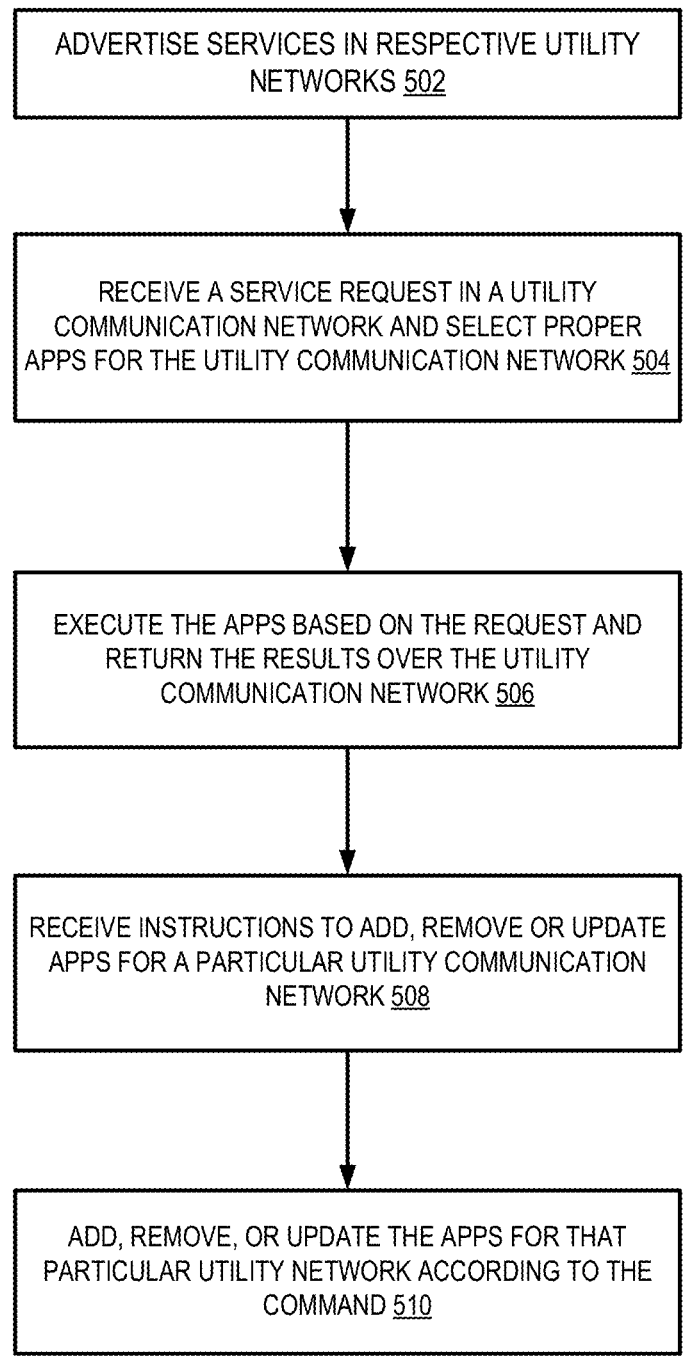
FIG. 5 shows an example of a process performed by an edge intelligence device to support multiple utility communication networks, according to certain aspects of the disclosure.

FIG. 5 shows an example of a process 500 performed by an edge intelligence device to support multiple utility communication networks, according to certain aspects of the disclosure. An edge intelligence device 214 in a utility communication network 240 can implement operations in process 500 by executing suitable program code. For illustrative purposes, the process 500 is described with reference to certain examples depicted in the figures. Other implementations, however, are possible.

At block 502, the process 500 involves the edge intelligence device 214 advertising services it can provide in each of the utility communication networks 240 that it is connected to. The services are determined based on the software applications 224 that are installed on the edge intelligence device 214. As discussed above, since some of the applications 224 are network specific, the edge intelligence device 214 advertises the services provided by these network-specific applications 224 only to the specific utility communication networks 240. The edge intelligence device 214 advertises the services by the shareable applications to all the utility communication networks 240 that the applications can be utilized. In some examples, a publish-subscribe mechanism is utilized to publish the services of the applications. In some implementations, the edge intelligence device 214 maintains a list of services that can be provided to each of the connected utility communication networks 240. The lists of services can be updated when applications are added, updated, or removed from the edge intelligence device 214.

At block 504, the process 500 involves the edge intelligence device 214 receiving a service request or task request in one of the utility communication networks 240. Based on the request, the edge intelligence device 214 selects the proper applications 224 to perform the tasks specified in the request. The proper applications can be determined based on the requested services and the utility communication network 240 where the request is received.

At block 506, the process 500 involves the edge intelligence device 214 executing the selected applications 224 to obtain the results. Depending on the nature of the requested task, the results can be returned to the requesting endpoint 212, another edge intelligence device 214, the utility fog 202 of the utility communication network 240, or discarded as discussed above with respect to FIG. 3. Blocks 504 and 506 may be repeated for service requests received from another supported utility communication network 240.

At block 508, the process 500 involves the edge intelligence device 214 receiving instructions to add, remove, or update software applications 224 installed on it from a particular utility communication network 240. In response to receiving such instructions, the edge intelligence device 214 performs corresponding operations, at block 510, to add/install, remove, or update the software applications 224 specified in the instructions. The edge intelligence device 214 may further update the list of applications for this utility communication network 240 accordingly.

Figure 6:
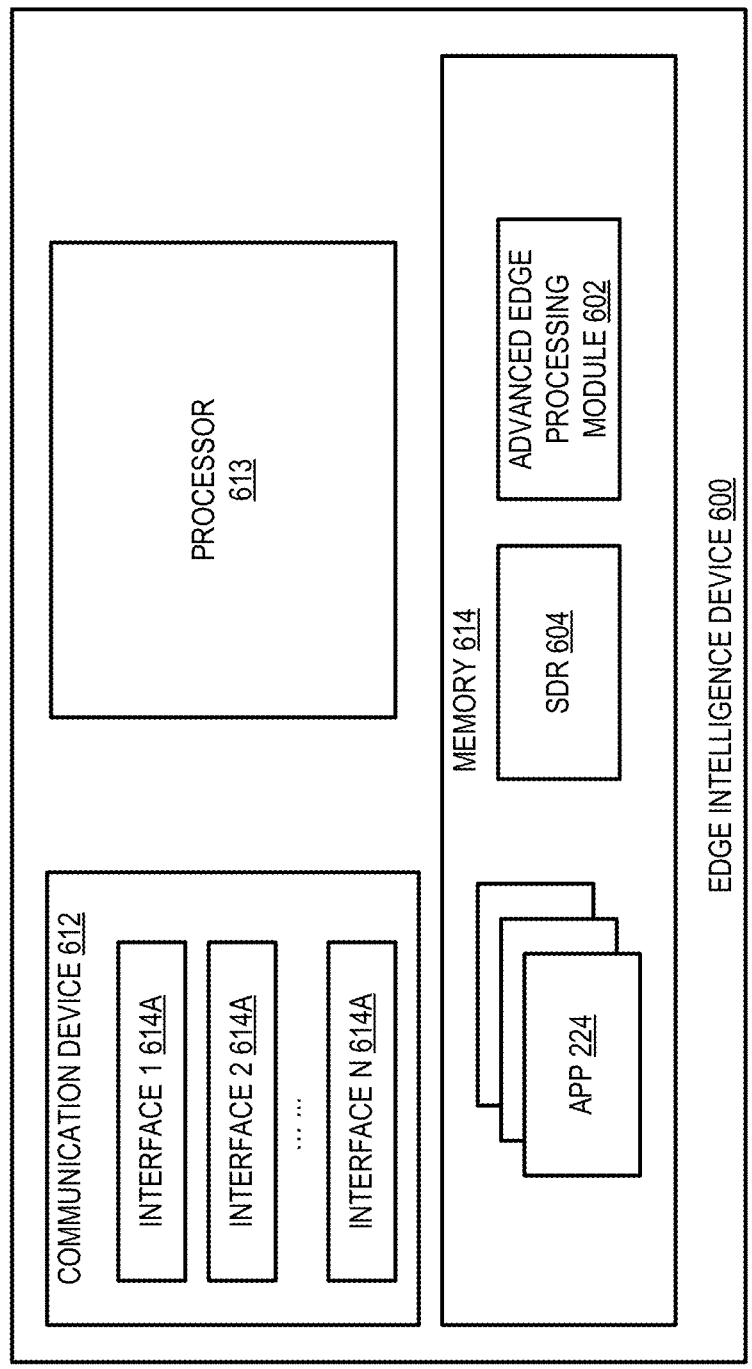
FIG. 6 is a block diagram depicting an example of an edge intelligence device suitable for implementing aspects of the techniques and technologies presented herein.

FIG. 6 illustrates an exemplary edge intelligence device 600 that can be employed to implement the edge intelligence for utility communication networks described herein. The exemplary edge intelligence device 600 may be the edge intelligence device 214 in the utility communication network 240 or the utility fog 202. The device 600 includes a communication device 612 configured for receiving service requests from the endpoints 212 and other devices in utility communication networks 240 and sending results and other data to other devices in the respective utility communication network 240. The communication device 612 has multiple network interfaces 614A-614N to communicate with multiple utility communication networks 240 or other networks (e.g., the cellular network). The multiple network interfaces 614A-614N may include any wireless or wired communication interfaces, such as antennas and radios. The communication device may also include a software defined radio (SDR) interface that handles multiple radio interfaces depending on specific SDR programs 604 stored in the memory 614.

The edge intelligence device 600 may also include a processor 613 and memory 614. The processor 613 controls functions performed by the edge intelligence device 600. The memory 614 may be utilized to store data used by the processor 613 to perform its function, such as the software applications 224 and an advanced edge processing module 602 configured to perform the advanced analysis using, for example, artificial intelligence or machine learning technologies as discussed above. As discussed above, in some examples, the edge intelligence device 600 may implement software-defined radios (SDR) interfaces and the memory 614 may also store the software 604 used for the SDR. The memory 614 may also store other data used by the edge intelligence device 600, such as the list of services that can be provided by the edge intelligence device 600 for each supported utility communication network 240.

It should be understood that the edge intelligence device 600 shown in FIG. 6 is merely an example and should not be construed as limiting. Other types of network devices may also be configured to implement the edge intelligence presented herein. For example, an edge intelligence device may be a device with a communication device for communication with only one utility communication network 240.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other types of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system, comprising:
   a utility fog comprising:
      a secure utility system configured for executing a private utility application, wherein the private utility application is executed exclusively by the secure utility system; and
      a first edge intelligence device configured for executing a first subset of applications of a plurality of software applications, wherein each application in the plurality of software applications is configured to process data collected by one or more endpoints in a mesh network managed by the utility fog or manage the one or more endpoints; and
   the mesh network in communication with the utility fog through another network, the mesh network comprising:
      a plurality of endpoints in communication with each other through the mesh network and configured for collecting data measuring characteristics of a resource distribution network;
      a second edge intelligence device configured for executing a second subset of applications of the plurality of software applications; and
      a third edge intelligence device configured for executing a third subset of applications of the plurality of software applications, wherein the first, second, and third subsets of applications are different;
      wherein an endpoint of the plurality of endpoints is further configured to:
         send a task request for a particular application to at least the second edge intelligence device and the third edge intelligence device; and
         receive processing results from the second edge intelligence device and the third edge intelligence device.

2. The system of claim 1, wherein the utility fog is further in communication with a regional fog, the regional fog comprising a fog device configured for executing a fourth subset of applications of the plurality of software applications, wherein the fourth subset of applications is different from the first, second, or third subset of applications.

3. The system of claim 2, wherein the mesh network is in communication with the regional fog and an edge intelligence device or an endpoint in the mesh network is configured to cause an application on the fog device to execute.

4. The system of claim 1, wherein both the first subset of software applications and the second subset of software applications comprise the particular application, and wherein the task request comprises data to be processed by the particular application and a task assignment list specifying portions of the data to be processed by the first edge intelligence device and the second edge intelligence device, respectively.

5. The system of claim 1, wherein one of the first, second, or third subset of applications comprises at least two instances of a same application.

6. The system of claim 1, wherein an endpoint of the plurality of endpoints is configured to execute a software application of the plurality of software applications.

7. The system of claim 1, wherein the second edge intelligence device is further configured for:
   receiving data for processing;
   determining that the received data is timely based on determining that a difference between a time of receiving the data and a time of the data being transmitted is lower than a threshold value;
   in response to determining that the received data is timely, processing the data by executing one or more of the second subset of applications; and
   in response to determining that the received data is not timely, discarding the data.

8. The system of claim 1, wherein the private utility application is configured to perform one or more of:
   causing an application or an application instance on the first, second, or third edge intelligence device to be updated;
   causing a new application or a new application instance to be installed on the first, second, or third edge intelligence device; and
   causing an existing application or an existing application instance to be removed from the first, second, or third edge intelligence device.

9. The system of claim 1, wherein the utility fog is further in communication with a cloud computing system configured for executing a fifth subset of applications of the plurality of software applications.

10. The system of claim 1, wherein the second edge intelligence device or the third edge intelligence device is integrated into a mesh network router or a gateway device.

11. An edge intelligence device, comprising:
    a communication device comprising a plurality of network interfaces configured for:
       communicating with devices in a plurality of utility communication networks, wherein:
          a first utility communication network of the plurality of utility communication networks is associated with a first resource distribution network,
          a second utility communication network of the plurality of utility communication networks is associated with a second resource distribution network,
          the first resource distribution network is different from the second resource distribution network; and
       communicating with respective utility fogs of the plurality of utility communication networks;
    a processing device configured to execute computer-readable instructions; and
    a memory configured to store a plurality of software applications and the computer-readable instructions that, when executed by the processing device, cause the processing device to perform operations comprising:
       parsing data received via the first utility communication network;
       parsing data received via the second utility communication network;
       executing at least one of the plurality of software applications to process the data received via the first utility communication network;
       executing one or more of the plurality of software applications to process the data received via the second utility communication network;
       generating a first message based on the processed data from the first utility communication network and transmitting the first message via the first utility communication network; and generating a second message based on the processed data from the second utility communication network and transmitting the second message via the second utility communication network.

12. The edge intelligence device of claim 11, wherein the first message is transmitted to an endpoint in the first utility communication network or a first utility fog configured for managing the first utility communication network, and the second message is transmitted to an endpoint in the second utility communication network or a second utility fog configured for managing the second utility communication network.

13. The edge intelligence device of claim 12, wherein the operations further comprise one or more of:
    updating a software application installed on the edge intelligence device using a software update to the software application responsive to receiving the software update;
    removing a software application from the edge intelligence device responsive to receiving a command to remove the software application; or
    installing a new software application to the edge intelligence device responsive to receiving a command to add the new software application.

14. The edge intelligence device of claim 13, wherein the plurality of software applications comprise an application exclusively used to process data received from the first utility communication network and wherein:
    a software update to the software application is received via the first utility communication network from the first utility fog;
    the software application is sent to the edge intelligence device via the first utility communication network from the first utility fog; or
    the software application is removed from the edge intelligence device responsive to receiving a command to remove the software application from the first utility fog via the first utility communication network.

15. The edge intelligence device of claim 11, wherein:
    the first utility communication network is a mesh network;
    the first resource distribution network is an electricity distribution network; and
    endpoints in the first utility communication network are electricity meters.

16. The edge intelligence device of claim 15, wherein:
    the second utility communication network is a LoRaWAN network;
    the second resource distribution network is a gas distribution network or a water distribution network; and
    endpoints in the second utility communication network are gas meters or water meters.

17. The edge intelligence device of claim 15, wherein the operations further comprising:
    receiving and parsing additional data according to a first network protocol of the first utility communication network; and
    generating and transmitting a third message according to a second network protocol of the second utility communication network, wherein the first network protocol is different from the second network protocol.

18. A mesh network, comprising:
    a plurality of endpoints in communication with each other through the mesh network and configured for collecting data measuring characteristics of a resource distribution network associated with the mesh network; and
    a plurality of edge intelligence devices, each edge intelligence device configured for executing a subset of software applications of a plurality of software applications,
    wherein each software application in the plurality of software applications is configured to process data collected by one or more endpoints of the plurality of endpoints or manage the one or more endpoints,
    wherein a first subset of software applications on a first edge intelligence device is different from a second subset of software applications on a second edge intelligence device,
    wherein an endpoint of the plurality of endpoints is further configured to:
        send a task request for a particular application to at least the first edge intelligence device and the second edge intelligence device; and
        receive processing results from the first edge intelligence device and the second edge intelligence device, and
    wherein the mesh network is in communication with a utility fog through another network, the utility fog comprising a secure utility system configured for executing a private utility application, wherein the private utility application is executed exclusively by the secure utility system, and an additional edge intelligence device configured for executing another subset of applications of the plurality of software applications.

19. The mesh network of claim 18, wherein one of the first or second subset of software applications comprises at least two instances of a same software application.

20. The mesh network of claim 18, wherein an endpoint of the plurality of endpoints is configured to execute a software application of the plurality of software applications.

* * * * *